(12) United States Patent
Kambe et al.

(10) Patent No.: US 8,197,961 B2
(45) Date of Patent: Jun. 12, 2012

(54) BATTERY MODULE WITH BENDING COLLECTOR PLATES

(75) Inventors: Yutaka Kambe, Kosai (JP); Takashi Asahina, Toyohashi (JP); Masato Onishi, Toyohashi (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 578 days.

(21) Appl. No.: 11/740,999

(22) Filed: Apr. 27, 2007

(65) Prior Publication Data

US 2007/0254211 A1 Nov. 1, 2007

(30) Foreign Application Priority Data

Apr. 28, 2006 (JP) .................. 2006-126979

(51) Int. Cl.
*H01M 4/00* (2006.01)
*H01M 6/42* (2006.01)
(52) U.S. Cl. .......................... 429/160; 429/66
(58) Field of Classification Search .................. 429/160, 429/161
See application file for complete search history.

(56) References Cited

U.S. PATENT DOCUMENTS

| | | | |
|---|---|---|---|
| 6,761,993 B1 | 7/2004 | Karasawa et al. | |
| 2001/0036574 A1* | 11/2001 | Fukuda et al. | 429/161 |
| 2002/0045095 A1* | 4/2002 | Taniguchi et al. | 429/161 |

FOREIGN PATENT DOCUMENTS

| | | | |
|---|---|---|---|
| JP | 52-145423 U | | 4/1951 |
| JP | 52-145424 U | | 4/1951 |
| JP | 07226197 A | | 8/1995 |
| JP | 08-083598 A | | 3/1996 |
| JP | 2001-93505 A | | 4/2001 |
| JP | 2001093503 A | | 6/2001 |
| JP | 2001325938 A | | 11/2001 |
| JP | 2002304980 A | | 10/2002 |
| JP | 2003045405 A | | 2/2003 |
| JP | 2003282043 A | * | 10/2003 |

OTHER PUBLICATIONS

Office Action from Japanese Patent Office for corresponding Japanese Application No. JP 2006-126979; dated May 10, 2011.

* cited by examiner

*Primary Examiner* — Barbara Gilliam
*Assistant Examiner* — Stephan Essex
(74) *Attorney, Agent, or Firm* — Sughrue Mion, PLLC

(57) ABSTRACT

A secondary battery according to the invention includes six power generation elements and a case having six mounting spaces in which the power generation elements are disposed, respectively. A positive electrode connecting portion of a positive electrode current collector plate of one of the power generation elements adjacent to each other is connected via a connecting hole in a partition wall to a negative electrode connecting portion of a negative electrode current collector plate of the other power generation element, whereby the secondary battery is provided. The positive electrode connecting portion of the positive electrode current collector is formed so as to bend more easily in an approaching direction B2, which is opposite to a detaching direction B1, than a first positive electrode plate welded portion and a positive electrode plate adjacent distal portion, where bending portions are provided on both sides, do.

9 Claims, 9 Drawing Sheets

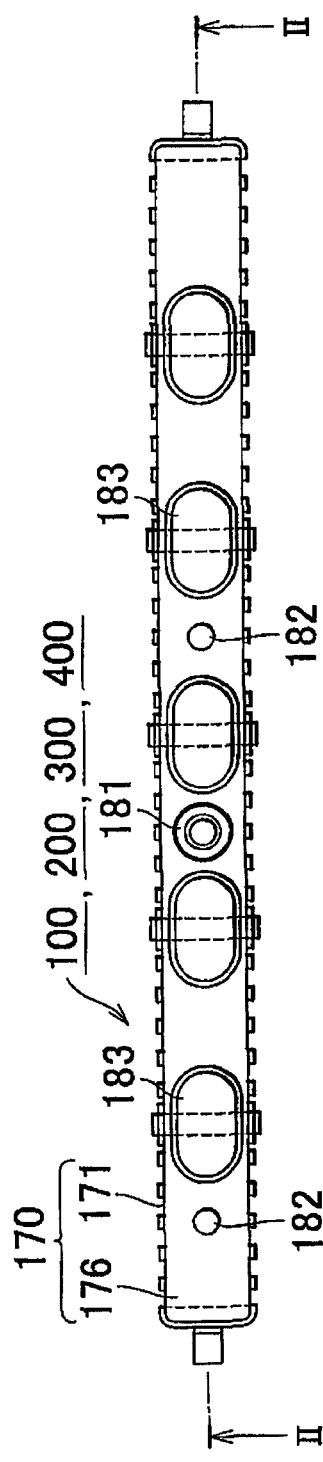
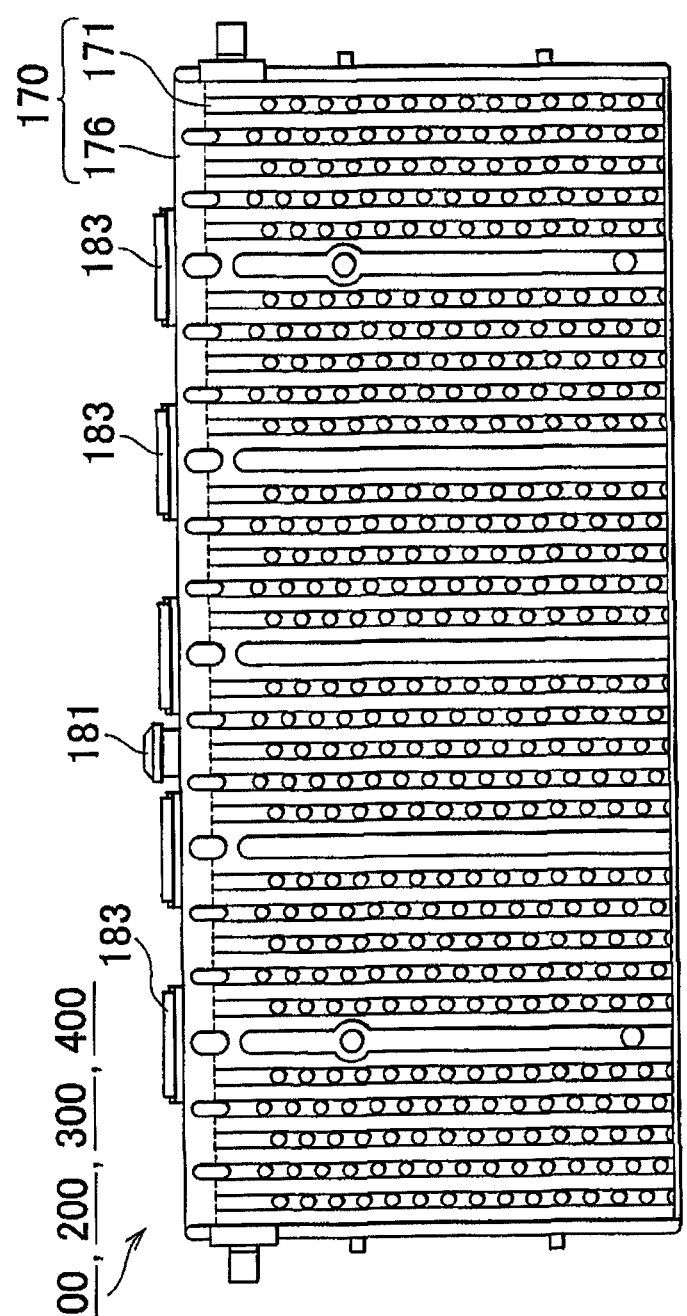

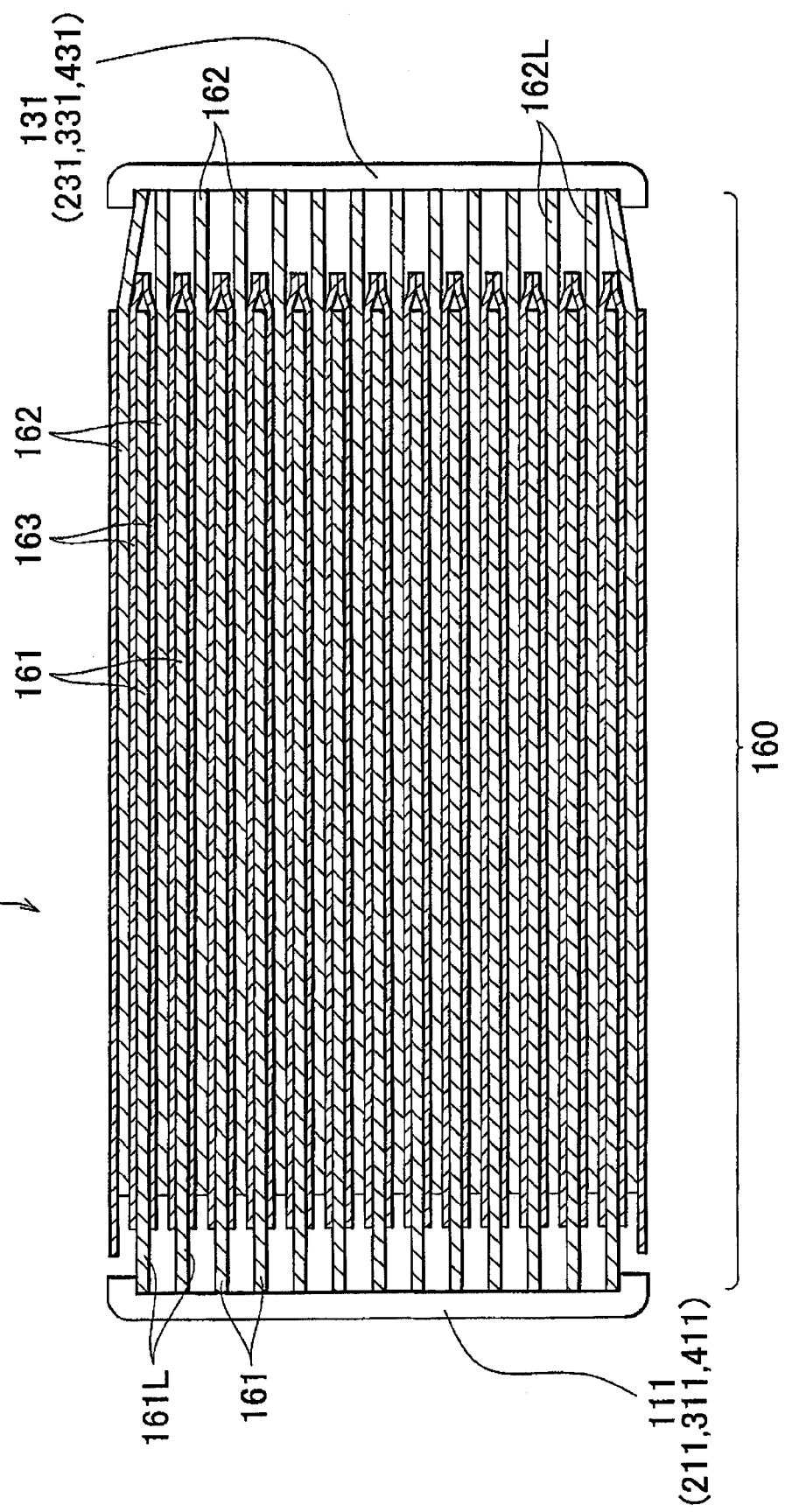

BATTERY MODULE WITH BENDING COLLECTOR PLATES

INCORPORATION BY REFERENCE

The disclosure of Japanese Patent Application No. 2006-126979 filed on Apr. 28, 2006 including the specification, drawings and abstract is incorporated herein by reference in its entirety.

BACKGROUND OF THE INVENTION

1. Field of the Invention

The invention relates to a battery module.

2. Description of the Related Art

In recent years, various secondary batteries have been proposed as the power sources for portable devices and mobile devices and also as the power sources for electric vehicles and hybrid vehicles (For example, see JP-A-2001-93505).

The secondary battery (battery module) described in JP-A-2001-93505 has: electrode assemblies each including a positive electrode plate, a negative electrode plate, and two current collector plates (the first and second current collector plates) for the positive electrode and the negative electrode, respectively; and a case having a plurality of battery chambers (mounting spaces) partitioned from each other by partitioned walls. In the electrode assembly, the first current collector plate is welded to one of the positive electrode plate and the negative electrode plate and the second current collector plate is welded to the other of the positive electrode plate and the negative electrode plate, and each electrode assembly is disposed in a corresponding one of the battery chambers, whereby a battery cell is formed therein. In each battery cell, the connecting post (connecting portion) of each power current collector plate (the first current collector plate) is connected to the connecting post (connecting portion) of the other power current collector plate (the second current collector plate) of the adjacent battery cell, via a communication hole (connecting hole) formed in the partition wall of the case, whereby the battery module is formed.

In some of such secondary batteries, the current collector plates of each electrode assembly (power generation element), which are located adjacent to each other and disposed in the respective battery chambers, are bended so as to allow their connecting posts (connecting portion, adjacent connecting portion) to be connected to each other in a communication hole (connecting hole) in the partition wall in the case, and the connecting posts are attached to each other by welding, or the like. With this arrangement, an elastic force acting in the direction in which the connecting posts of the adjacent current collector plates are detached away from each other may remain in some of the current collector plates. In this case, pressure may concentrate on the welded point between the current collector plate with the remaining elastic force and the electrode plate that is located closest to the connecting portion and on the vicinity of that welded point, so that the welded point is ruptured and the electric resistance between the current collector plate and the electrode plate thus increases at the ruptured point.

SUMMARY OF THE INVENTION

It is an object of the invention to provide a battery module in which multiple power generation elements are fixedly connected to each other through connections between the current collector plates of the respective battery modules and which provides highly reliable connections between the current collector plates and the electrodes plates.

A first aspect of the invention relates to a battery module, including: a plurality of power generation elements each of which has a positive electrode plate, a negative electrode plate, a first current collector plate that is welded at least one electrode plate welded portion to one of the positive electrode plate and the negative electrode plate, and a second current collector plate that is welded at least one electrode plate welded portion to the other of the positive electrode plate and the negative electrode plate; and a case in which the power generation elements are disposed and which has at least one partition wall that defines a plurality of mounting spaces in the case, the power generation elements being disposed within the respective mounting spaces. In this battery module, each of the first current collector plate and the second current collector plate has a connecting portion, a connection side electrode plate welded portion that is located closest to the connecting portion among the electrode plate welded portions, a connection side portion that is located between the connection side electrode plate welded portion and the connecting portion, a distal portion that is located further from the connecting portion than the connection side electrode plate welded portion is, and an adjacent distal portion that is a portion of the distal portion and is located adjacent to the connection side electrode plate welded portion, the connecting portion of the first current collector plate of one of the power generation elements is fixedly connected, via a connection hole formed in the partition wall, to the connecting portion of the second current collector plate of the adjacent power generation element, and the connection side portion of the first current collector plate and the connection side portion of the second current collector plate are formed such that each of the connection side portion of the first current collector plate and the connection side portion of the second current collector plate can bend more easily in a direction opposite to a direction in which the connecting portion of the first current collector plate and the connecting portion of the second current collector plate are detached away from each other than the connection side electrode plate welded portion and the adjacent distal portion do.

According to the battery module of the first aspect of the invention, the first current collector plate is welded at the electrode plate welded portion to one of the positive electrode plate and the negative electrode plate, and the connecting portion of the first current collector plate is fixedly connected to the adjacent connecting portion of the adjacent power generation element such that an elastic force acting in the direction in which the connecting portion and the adjacent connecting portion are detached away from each other may remain in the first current collector plate. Also, the first current collector plate is welded at the current electrode plate welded portion or portions to at least one electrode plate. However, the relationship among the connection side electrode plate welded portion located closet to the connecting portion, the connection side portion located between the connection side electrode plate welded portion and the connecting portion, and the adjacent distal portion located adjacent to the connection side electrode plate welded portion is such that the connection side portion bends more easily in the direction opposite to the detaching direction than the connection side electrode plate welded portion and the adjacent distal portion do. Therefore, even if an elastic fore acting in the detaching direction remains in the first current collector plate, the connection side portion of the first current collector plate bends more than other portions do and thus absorbs the remaining elastic force, thereby suppressing concentration of stress (reactive force), which may otherwise be caused by the elastic force remaining in the first current collector plate. As such, it is possible to prevent cracks and ruptures in the connection side electrode plate welded portion and thus a resultant increase in the electric resistance between the first current collector plate and the electrode plates. Thus, the battery module according to the first aspect of the invention provides highly reliable connections between the first current collector plates and the electrode plates.

The battery module described above may be such that the first current collector plate has at least one of a bending prevention portion that prevents the connection side electrode plate welded portion and the adjacent distal portion from bending in the direction opposite to the detaching direction and a bending facilitation portion that is provided in the connection side portion to facilitate bending of the connection side portion in the direction opposite to the detaching direction.

According to this structure, because the first current collector plate includes at least one of the bending prevention portion that prevents bending of the connection side electrode plate welded portion and the adjacent distal portion in the direction opposite to the detaching direction and the bending facilitation portion that is provided in the connection side portion, even if an elastic force acting in the detaching direction remains in the first current collector plate, the remaining elastic force is absorbed by the connection side portion bending shapely, whereby the connection side electrode plate welded portion and the adjacent distal portion are effectively prevented from bending. As such, in the battery module described above, concentration of pressure (reactive force) on the connection side electrode plate welded portion can be effectively prevented.

Further, the battery module according to the first aspect of the invention may be such that each of the connection side electrode plate welded portion and the adjacent distal portion is a plated-shaped portion, a thickness direction of which matches the detaching direction, and the bending prevention portion is a plate-shaped bending portion that bends from the connection side electrode plate welded portion and the adjacent distal portion and extends in the thickness direction of the connection side electrode plate welded portion and the adjacent distal portion.

Because each of the connection side electrode plate welded portion and the adjacent distal portion is a plate-shaped portion having the thickness direction matching the detaching direction, they tend to bend easily when an elastic force acting in the detaching direction remains in the first current collector plate. However, in the battery module described above, because the bending portion which is served as the bending prevention portion is also provided at the connection side electrode plate welded portion and the adjacent distal portion, the connection side electrode plate welded portion and the adjacent distal portion, due to the presence of the bending portion, can be effectively prevented from bending in the thickness direction of the connection side electrode plate welded portion and the adjacent distal portion.

According to the battery module described above, further, the bending portion can be formed by simply bending the plate-shaped portion adjacent to the connection side electrode plate welded portion and the adjacent distal portion. That is, the bending portion can be formed in a simple manner and at a low cost, which is desirable.

The battery module according to the first aspect of the invention may be such that each of the connection side electrode plate welded portion and the adjacent distal portion is a plated-shaped portion, a thickness direction of which matches the detaching direction, the bending prevention portion is formed in at least one of the connection side electrode plate welded portion and the adjacent distal portion, and a cross section of the bending prevention portion perpendicular to a direction connecting the connecting portion and the connection side electrode plate welded portion has convex and concave portions that are formed in the thickness direction.

Because each of the connection side electrode plate welded portion and the adjacent distal portion of the first current collector plate is a plate-shaped portion having the thickness direction matching the detaching direction, they tend to easily bend if an elastic force acting in the detaching direction remains in the first current collector plate. However, according to the battery module descried above, because the cross section of the bending prevention portion perpendicular to the direction connecting the connecting portion and the connection side electrode plate welded portion has the convex and concave portions formed in the thickness direction, even if an elastic force acting in the detaching direction remains in the first current collector plate, the connection side electrode plate welded portion and the adjacent distal portion, due to the presence of the convex and concave portions, can be effectively prevented from bending.

For example, the convex and concave portions stated above may portions each projecting in the thickness direction of the plate-shaped portion, which are intermittently formed by pressing in the direction perpendicular to the direction connecting the connecting portion and the connection side electrode plate welded portion and extend in the direction perpendicular to the direction connecting the connecting portion and the connection side electrode plate welded portion. Alternatively, the convex and concave portions may be portions of a plate-shaped portion that is formed in the shape of a sinusoidal wave, the amplitude direction of which matches the thickness direction.

Further, the battery module according to the first aspect of the invention may be such that the bending facilitation portion is a small cross section portion which is formed in the connection side portion and a cross sectional area of which is smaller than the cross sectional area of other portions on a plane perpendicular to the direction connecting the connecting portion and the connection side electrode plate welded portion.

In this structure, the connection side portion has, as the bending facilitation portion, the small cross section portion with a cross sectional area that is smaller than the cross sectional area of other portion on a plane perpendicular to the direction connecting the connecting portion and the connection side electrode plate welded portion. That is, because the cross section of the small cross section portion perpendicular to the direction connecting the connecting portion and the connection side electrode plate welded portion is smaller than the cross sectional area of other portion, the first current collector plate tends to bend at the small cross section portion if an elastic force acting in the detaching direction remains in the first current collector plate. Therefore, when an elastic force acting in the detaching direction remains in the first current collector plate, the remaining elastic force is absorbed by the small cross section portion bending sharply, and thus concentration of stress (reaction force) on the connection side electrode plate welded portion can be effectively prevented.

The above-stated small cross section portion may be, for example, a potion of the connection side portion at which a notch or hole is formed and which is thus formed smaller in the substantial lateral length than other potions. Also, the small cross section portion may be a potion of the connection side potion that is made thinner than other portions by pressing, cutting, or the like.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 1A is a plan view of a secondary battery according to exemplary embodiments of the invention, and FIG. 1B is a front view of the same secondary battery;

FIG. 3 is a cross-sectional view taken along the line III-III in FIG. 2 and showing the power generation elements of the secondary battery according to the exemplary embodiments;

DETAILED DESCRIPTION OF THE EXEMPLARY EMBODIMENTS

Figure 2:
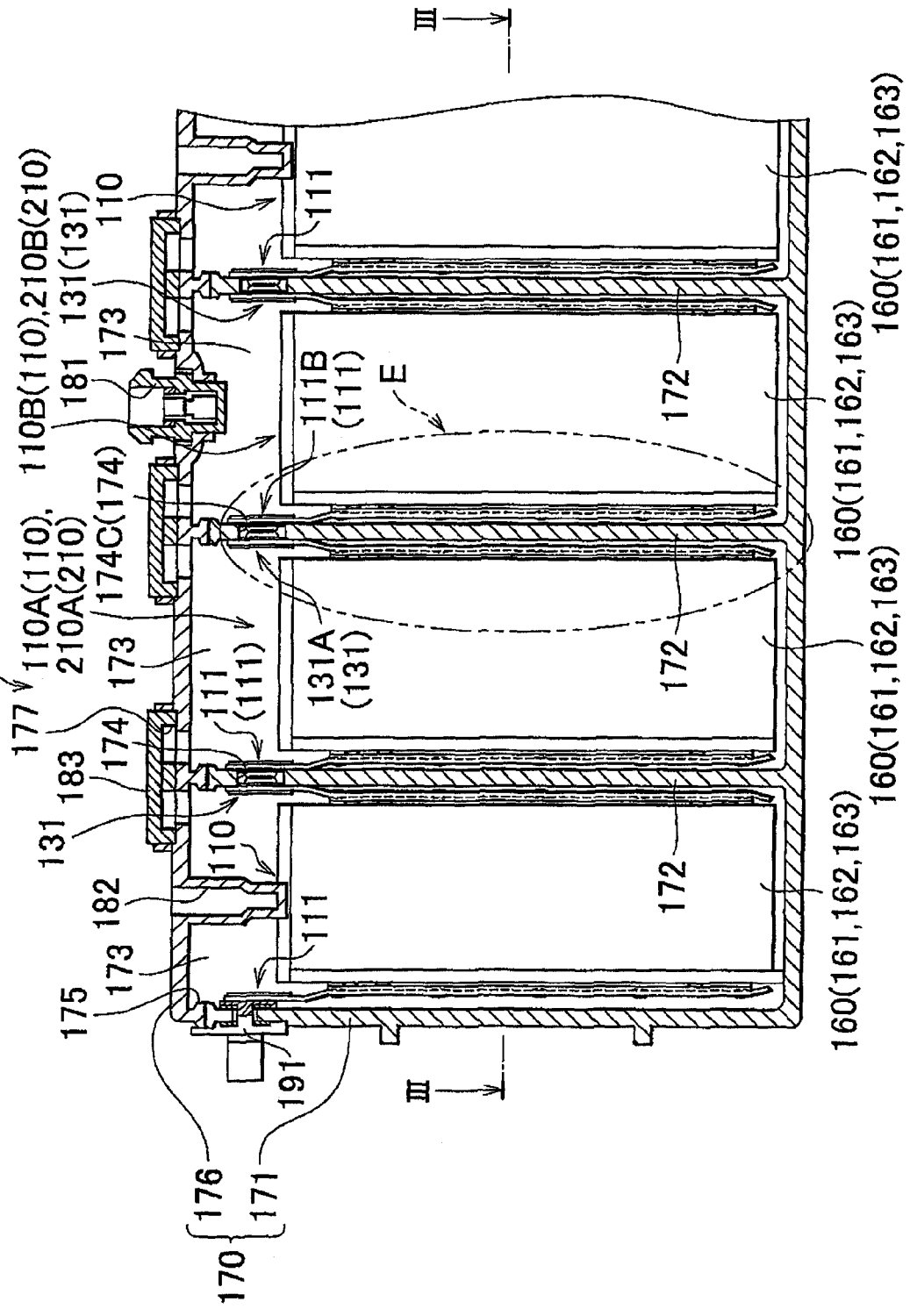
FIG. 2 is a cross-sectional view taken along the line II-II in FIG. 1 and showing the inside of the secondary battery according to the exemplary embodiments.

Hereinafter, exemplary embodiments (the first to forth exemplary embodiments) will be described with reference to the accompanying drawings.

(First Exemplary Embodiment)

A secondary battery 100 (will be referred to also as "battery module") according to the first exemplary embodiment is a nickel-metal hydride secondary battery that can be used as the power source for driving electric vehicles and hybrid vehicles. The secondary battery 100 has six power generation elements 110 and a battery case 170 that is constituted by a case body member 171 for accommodating the power generation elements 110 and a lid member 176 (See FIG. 1 and FIG. 2). Further, each of the power generation elements 110 includes an electrode stack 160 comprised of a plurality of positive electrode plates 161 and a plurality of negative electrode plates 162, a positive electrode current collector plate 111 to which the positive electrode plates 161 are attached, and a negative electrode current collector plate 131 to which the negative electrode plates 162 are attached. The case body member 171 has a rectangular parallelepiped shape. In the case member 171, six mounting spaces 173 are provided, which are partitioned from each other by partition walls 172. The power generation elements 110 are disposed in the mounting spaces 173, respectively, and the mounting spaces 173 are filled with electrolyte, whereby battery cells are formed therein.

As will be described in detail later, a negative electrode connecting portion 132 of the negative electrode current collector plate 131 of one of the power generation elements 110 that are adjacent to each other is connected to a positive electrode connecting portion 112 of the positive electrode current collector plate 111 of the other of the adjacent power generation elements 110 via a connection hole 174 provided in the partition wall 172 therebetween, whereby the secondary battery 100 is formed. In the first exemplary embodiment, with regard to each connection between the adjacent power generation elements 110, the direction in which the positive electrode connecting portion 112 of the positive electrode current collector plate 111 and the negative electrode connecting portion 132 of the negative electrode connecting portion 131 are detached away from each other (the horizontal direction in FIG. 2) will be referred to as "detaching direction". Note that the secondary battery 100 corresponds to "battery module" in the invention and the case body member 171 corresponds to "case" in the invention.

The power generation elements 110 of the secondary battery 100 will hereinafter be described with reference to FIG. 1 to FIG. 5. As mentioned above, each of the power generation elements 110 is constituted by the electrode stack 160, the positive electrode current collector plate 111, and the negative electrode current collector plate 131 (See FIG. 3). The electrode stack 160 includes a number of positive electrode plates 161, negative electrode plates 162, and separators 163. Each of the separators 162 is formed in the shape of a bag. The positive electrode plates 161 are inserted into the separators 163, respectively. In the electrode stack 160, the positive electrode plates 161 covered by the respective separators 163 and the negative electrode plates 162 are alternately stacked on top of each other. As will be described in detail later, a lead portion 161L which is located in one end of the positive electrode plate 161 (the left end in FIG. 3) is welded to the positive electrode current collector plate 111 so that the positive electrode plates 161 and the positive electrode current collector plate 111 are electrically connected. Likewise, a lead portion 162L which is located in one end of the negative electrode plate 162 (the right end in FIG. 3) is welded to the negative electrode current collector plate 131 so that the negative electrode plates 162 and the negative electrode current collector plate 131 are electrically connected.

For example, each positive electrode plate 161 is an electrode plate in which active material including nickel hydroxide is supported on active material carrier such as foamed nickel, and each negative electrode plate 162 is an electrode plate that contains hydrogen-absorbing alloy as the material forming the negative electrode. Each separator 163 is formed of, for example, a non-woven fabric made of synthetic fibers that have been made hydrophilic by specific processing.

Figures 4A, 4B:
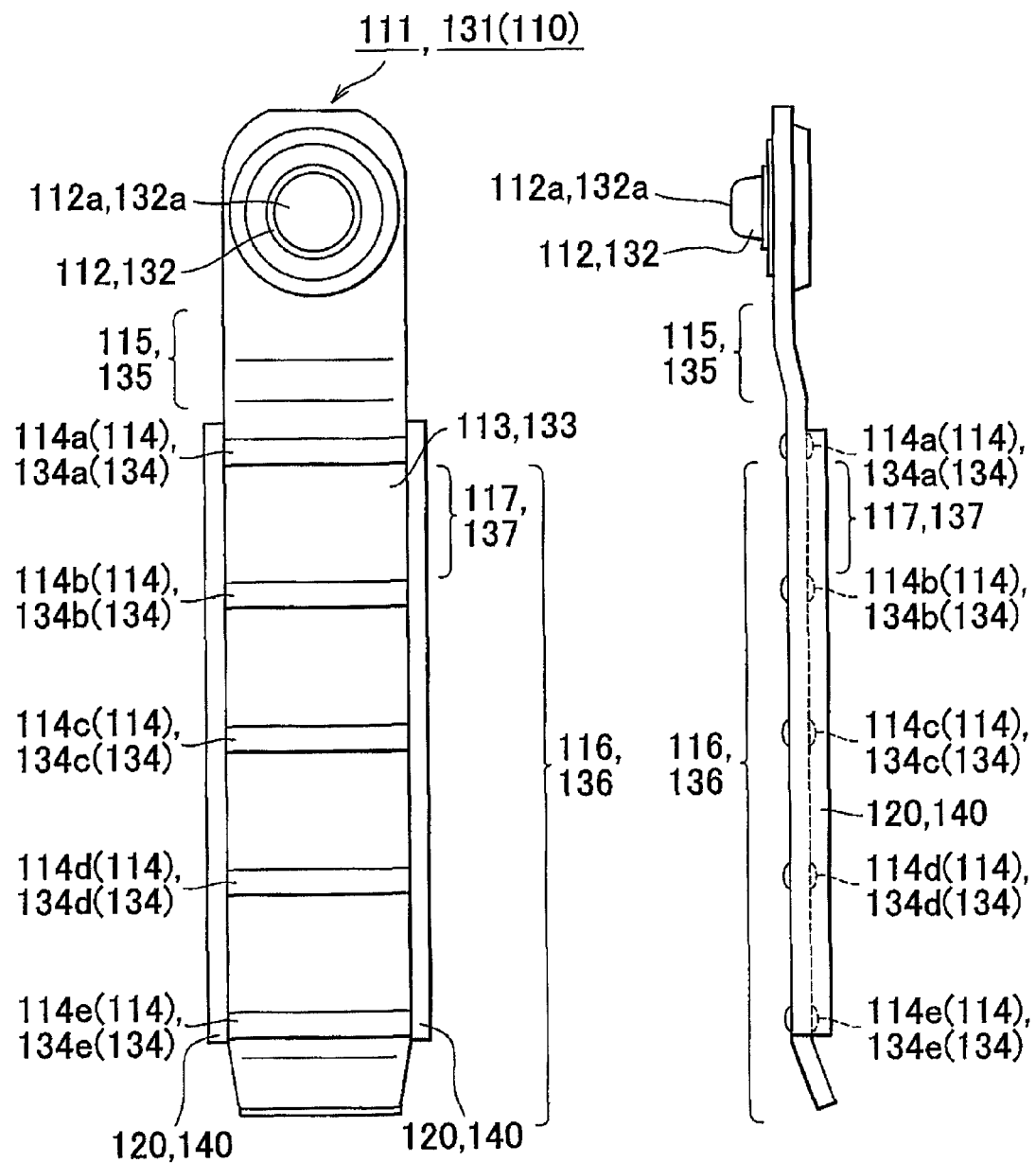
FIG. 4A is a front view of the positive electrode current collector plate and the negative electrode current collector plate used in each power generation element in the first exemplary embodiment.
FIG. 4B is a side view of the same current collector plates.

The positive electrode current collector plate 111, to which the positive electrode plates 161 are attached as descried above, is a metal plate such as a nickel plate or a nickel-plated steel plate. As shown in FIG. 4, the positive electrode current collector plate 111 has the positive electrode connecting portion 112, a positive electrode connection side portion 115, and a positive electrode plate-shaped portion 113. In the positive electrode plate-shaped portion 113 are provided positive electrode plate welded portions 114 to which the lead portions 161L of the positive electrode plates 161 are attached. Further, bending portions 120 are provided at both of the lateral side edges of the positive electrode plate-shaped portion 113 (the edges on both sides in the horizontal direction in FIG. 4A), respectively. The positive electrode connecting portion 112 of the positive electrode current collector plate 1111 is located in the root end side of the positive electrode current collector plate 111 (the upper side in FIG. 4). The positive electrode connecting portion 112 projects at a positive electrode connecting face 112a, which is the surface of the center portion of the positive electrode connecting portion 112, and thus is formed in the shape of a circular dome. The positive electrode connecting portion 112 is the portion to be in contact with the negative electrode connecting portion 132 of the negative electrode current collector plate 131, which will be described later. The positive electrode connection side portion 115 is located between the positive electrode connecting portion 112 and a first positive electrode plate welded portion 114a among the positive electrode plate welded portions 114, which will be described later. In the first exemplary embodiment, the positive electrode current collector plate 111 corresponds to "first current collector plate" and the positive electrode connecting portion 112 corresponds to "connecting portion".

Five positive electrode plate welded portions 114 (114a to 114e) are provided on the side of the positive electrode plate-shaped portion 113 that is opposite to the side on which the projected positive electrode connecting face 112a of the positive electrode connecting portion 112 is located. The positive electrode plate welded portions 114 (114a to 114e) are arranged over almost the entire lateral length of the positive electrode plate-shaped portion 113. As mentioned above, the lead portions 161L of the positive electrode plates 161 of the electrode stack 160 are attached to the respective positive electrode plate welded portions 114 by electron beam welding (See FIG. 3). In the first exemplary embodiment, among the five positive electrode plate welded portions 114, the one located closest to the positive electrode connecting portion 112 is the first positive electrode plate welded portion 114a, and those located further from the positive electrode connecting portion 112 in order are the second positive electrode plate welded portion 114b, the third positive electrode plate welded portion 114c, and the fourth positive electrode plate welded portion 114d, and the one located closest to the distal end of the positive electrode current collector plate 111 is the fifth positive electrode plate welded portion 114e. These positive electrode plate welded portions 114a to 114e are spaced a given distance apart from each other. Note that the positive electrode plate welded portions 114 correspond to "electrode plate welded portion" in the invention and the first positive electrode plate welded portions 114a corresponds to "connection side electrode plate welded portion" in the invention.

Further, as shown in FIG. 4, the bending portions 120 are provided at both of the lateral side edges of the positive electrode plate-shaped portion 113, respectively. Each bending portion 120 is a plated-shaped portion that bends from the positive electrode plate-shaped portion 113 and extends in the thickness direction of the positive electrode plate-shaped portion 113. The bending portions 120 are formed across the area where the positive electrode plate welded portions 114a to 114e are provided. That is, the bending portions 120 are provided in positive electrode distal portion 116 that are located further from the positive electrode connecting portion 112 than the first positive electrode plate welded portions 114a is. Therefore, portions of the bending portions 120 are located in positive electrode plate adjacent distal portion 117, respectively, which are adjacent to the first positive electrode plate welded portion 114a. In this structure, the bending portions 120 serve to prevent the positive electrode plate welded portions 114 and the positive electrode plate adjacent distal portion 117 from bending in their thickness directions (the horizontal direction in FIG. 4B). In the first exemplary embodiment, the bending portions 120 correspond to "bending prevention portion" in the invention.

Also, the positive electrode connection side portion 115 corresponds to "connection side portion" in the invention and the positive electrode plate adjacent distal portion 117 corresponds to "adjacent distal portion" in the invention. Note that, in FIG. 4 illustrating the first exemplary embodiment, the positive electrode plate adjacent distal portion 117 are indicated, for convenience of description, as the portions located between the first positive electrode plate welded portion 114a and the second positive electrode plate welded portion 114b in the positive electrode plate-shaped portion 113.

On the other hand, the negative electrode current collector plate 131 to which the negative electrode plates 162 are attached is a current collector plate that has substantially the same material and shape as those of the positive electrode current collector plate 111 and only differs in polarity. Thus, like the positive electrode current collector plate 111, the negative electrode current collector plate 131 has a negative electrode plate distal portion 136 that includes the negative electrode connecting portion 132, a negative electrode connection side portion 135, and a negative electrode plate-shaped portion 133. Provided in the negative electrode plate-shaped portion 133 of the negative electrode plate distal portion 136 are negative electrode plate welded portions 134 (134a to 134e) to which the lead portions 162L of the respective negative electrode plates 162 are attached and bending portions 140 that are formed at both of the lateral side edges of the negative electrode plate-shaped portion 133 (the edges on both sides in the horizontal direction in FIG. 4A), respectively. The negative electrode connecting portion 132 of the positive electrode current collector plate 131 is located in the root end side of the negative electrode current collector plate 131 (the upper side in FIG. 4). The negative electrode connecting portion 132 projects at a positive electrode connecting face 132a, which is the surface of the center portion of the positive electrode connecting portion 132, and thus is formed in the shape of a circular dome. The negative electrode connecting portion 132 is the portion to be in contact with the positive electrode connecting portion 112 of the positive electrode current collector plate 111. In the negative electrode current collector plate 131, the negative electrode connection side portion 135 is located between the negative electrode connecting portion 132 and the first negative electrode plate welded portion 134a among the negative electrode plate welded portions 134, which will be described later. In the first exemplary embodiment, the negative electrode current collector plate 131 corresponds to "second current collector plate" in the invention. Note that the positive electrode current collector plate 111 may be regarded as corresponding to "second current collector plate" and the negative electrode current collector plate 131 may be regarded as corresponding to "first current collector plate" in the invention, as opposed to the foregoing explanations.

The negative electrode plate-shaped portion 133 has five negative electrode plate welded portions 134 (134a to 134e) that are provided on the side of the negative electrode plate-shaped portion 133 that is opposite to the side on which the projected positive electrode connecting face 132*a* of the negative electrode connecting portion 132 is located. The negative electrode plate welded portions 134 (134*a* to 134*e*) are arranged over almost the entire length of the negative electrode plate-shaped portion 133 in the lateral direction. As mentioned above, the lead portions 162L of the negative electrode plates 162 of the electrode stack 160 are attached to the respective negative electrode plate welded portions 134 by electron beam welding (See FIG. 3). Among the five negative electrode plate welded portions 134, the one located closest to the negative electrode connecting portion 132 is the first negative electrode plate welded portion 134*a*, and those located further from the negative electrode connecting portion 132 in order are the second negative electrode plate welded portion 134*b*, the third negative electrode plate welded portion 134*c*, and the fourth negative electrode plate welded portion 134*d*, and the one located closest to the distal end of the negative electrode current collector plate 132 is the fifth negative electrode plate welded portion 134*e*. These negative electrode plate welded portion 134*a* to 134*e* are spaced a given distance apart from each other.

Further, as shown in FIG. 4, the bending portions 140 are provided at both of the lateral side edges of the negative electrode plate-shaped portion 133, respectively. Each of the bending portions 140 bends from the negative electrode plate-shaped portion 133 and extends in the thickness direction of the negative electrode plate-shaped portion 133. The bending portions 140 are formed across the area where the first negative electrode plate welded portion 134*a* to 134*e* are provided. That is, the bending portions 140 are provided in negative electrode distal portion 136 that are located further from the negative electrode connecting portion 132 than the first negative electrode plate welded portion 134*a* is. Therefore, portions of the bending portions 140 are located in a negative electrode plate adjacent distal portion 137, respectively, which are adjacent to the first negative electrode plate welded portion 134*a*. In this structure, the bending portions 140 serve to prevent the negative electrode plate welded portions 134 and the positive electrode plate adjacent distal portion 137 from bending in their thickness directions (the horizontal direction in FIG. 4B).

Note that, in FIG. 4 illustrating the first exemplary embodiment, the negative electrode plate adjacent distal portion 137 are indicated, for convenience of description, as the portions located between the first negative electrode plate welded portion 134*a* and the second negative electrode plate welded portion 134*b* in the negative electrode plate-shaped portion 133.

Next, the battery case 170 of the secondary battery 100 will be described with reference to FIG. 1A, FIG. 1B, and FIG. 2. FIG. 1A is a view showing the battery case 170 as seen from the side from which the respective power generation elements 110 are inserted into the battery case 170 (the upper side in FIG. 2). This side of the battery case 170 will be simply referred to as "inserting side". FIG. 1B and FIG. 2 are side views of the battery case 170 in the upright position where the upper side corresponds to the inserting side. The battery case 170 is constituted by the case body member 171 and the lid member 176, as mentioned above. The case body member 171 is formed by molding resin into a rectangular parallelepiped shape having an opening 175 in the inserting side (the upper side in FIG. 2). Provide in the case body member 171 are six mounting spaces 173 that are partitioned by five partition walls 172 (See FIG. 1 and FIG. 2), respectively. The capacity of each mounting space 173 is large enough to accommodate each power generation element 110 (See FIG. 2). Referring to FIG. 2, in the case body member 171, connecting holes 174 are formed at the inserting side portions of the partition walls 172 (the upper side portions of the partition walls 172 in FIG. 2), respectively, so that the mounting spaces 173 that are located adjacent to each other communicate with each other. The diameter of each connection hole 174 is large enough for the positive electrode connecting portion 112 of the positive electrode current collector plate 111 and the negative electrode connecting portion 132 of the negative electrode current collector plate 131 can be inserted.

The lid member 176 that covers the opening 175 of the case body member 171 is an oblong plate member made of resin. Five solution inlets 177, and a temperature sensor mounting hole 182 are formed in the lid member 176. A safety valve 181 is fit in the sensor mounting hole 182. The solution inlets 177 are the inlets from which electrolyte, which is not shown in the drawings, is poured into the respective mounting spaces 173. After electrolyte is filled in the mounting spaces 173, the solution inlets 177 are closed liquid-tight by inlet lids 183. The electrolyte used herein is for example an alkaline aqueous solution containing KOH and having a specific gravity of 1.2 to 1.4. The safety valve 181 opens in response to the internal pressure of the battery case 170 exceeding a reference value and ejects the gas within the battery case 170 (e.g., hydrogen gas) to the outside, so that an increase in the internal pressure of the battery case 170 is suppressed. A temperature sensor, which is not shown in the drawings, is inserted into the sensor mounting hole 182 and is used to detect the battery temperature.

Next, the method for manufacturing the power generation elements 110 in the first exemplary embodiment will be described. To begin with, the positive electrode plates 161 and the negative electrode plates 162 are sufficiently dried, and then the positive electrode plates 161 are inserted into the separators 163. Then, the positive electrode plates 161 covered by the separators 163 and the negative electrode plates 162 are alternately stacked on top of each other, whereby the electrode stack 160 is produced (See FIG. 3). When the positive electrode plates 161 and the negative electrode plates 162 are stacked, the positive electrode plates 161 are set in positions such that the lead portions 161L of the respective positive electrode plates 161 are located at prescribed positions in one side of the electrode stack 160 (the left side in FIG. 3), and the negative electrode plates 162 are set in positions such that the lead portions 162L of the negative electrode plates 162 are located at prescribed positions in the other side of the electrode stack 160 (the right side in FIG. 3).

Then, the electrode stack 160 is temporarily bound up using an assembly jig, which is not shown in the drawings, so as to prevent displacement of the stacked electrode plates 161, 162. Then, the positive electrode plate welded portions 114 (114*a* to 114*e*) of the positive electrode plate-shaped portion 113 of the positive electrode current collector plate 111 are placed in contact with the lead portions 161L of the respective positive electrode plates 161, and the negative electrode plate welded portions 134 (134*a* to 134*e*) of the negative electrode plate-shaped portion 133 of the negative electrode current collector plate 131 are placed in contact with the lead portion 162L of the respective negative electrode plates 162. Then, the positive electrode current collector plate 111 and the negative electrode current collector plate 131 are temporarily fixed to the electrode stack 160 suing an assembly jig, which is not shown in the drawings.

Next, alternating magnetic field is applied to the positive electrode current collector plate 111 and the negative electrode current collector plate 131 for demagnetization. When welding the positive electrode current collector plate 111 and the positive electrode plates 161, electron beam is applied to the positive electrode plate welded portions 114 (114a to 114e) of the positive electrode current collector plate 111 and the portions on the opposite side from the positive electrode plate welded portions 114 (114a to 114e) in vacuum while pressing the positive electrode plate welded portions 114 against the lead portions 161L of the positive electrode plates 161, so that the positive electrode current collector plate 111 and the positive electrode plates 161 are melted at the positive electrode plate welded portions 114 and thus welded to each other. Likewise, when welding the negative electrode current collector plate 131 and the negative electrode plates 162, electron beam is applied to the negative electrode plate welded portions 134 (134a to 134e) of the negative electrode current collector plate 131 and the portions on the opposite side from the negative electrode plate welded portions 134 (134a to 134e) in vacuum while pressing the negative electrode plate welded portions 134 against the lead portion 162L of the respective negative electrode plates 162, so that the negative electrode current collector plate 131 and the negative electrode plates 162 are melted at the negative electrode plate welded portions 134 and thus welded to each other.

As such, each power generation element 110 is structured as a battery cell having the positive electrode current collector plate 111 on one side and the negative electrode current collector plate 131 on the other side. Each power generation element 110 is formed such that the positive electrode connecting portion 112 of the positive electrode current collector plate 111 and the negative electrode connecting portion 132 of the negative electrode current collector plate 131 do not interfere with the partition walls 172 when the power generation elements 110 is disposed in the mounting spaces 173. More specifically, the positive electrode current collector plate 111 and the negative electrode current collector plate 131 are formed in a generally flat shape. That is, the portion of the positive electrode current collector plate 111 where the positive electrode connecting portion 112 is provided is not bent and the portion of the negative electrode current collector plate 131 where the negative electrode connecting portion 132 is provided is not bent. Note that the above-described demagnetization of the positive electrode current collector plate 111 and the negative electrode current collector plate 131 is performed in order to remove the magnetism of the positive electrode current collector plate 111 and the negative electrode current collector plate 131 prior to welding and thus prevent adverse effects of the magnetism on the electron beam.

Figure 5:
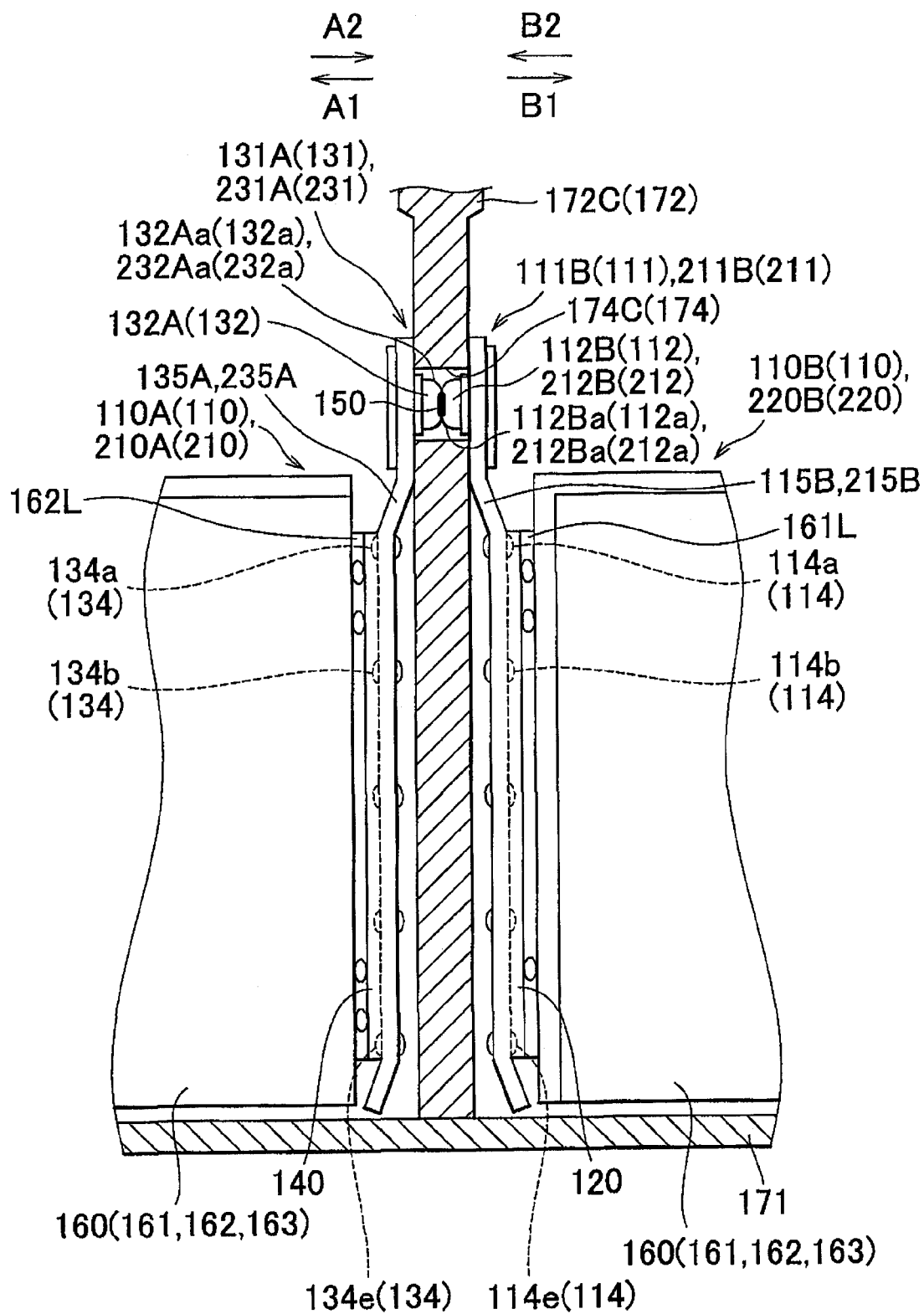
FIG. 5 is an enlarged view showing the portion indicated by the circle E in FIG. 2 and illustrating the connection between the power generation elements adjacent to each other in the first and second exemplary embodiments.

Then, the method for manufacturing the secondary battery 100 according to the first exemplary embodiment will be described with reference to FIG. 2 and FIG. 5. In the following description, a focus will be on the connection between the negative electrode current collector plate 131A of the power generation element 110A and the positive electrode current collector plate 111B of the power generation element 110B that is adjacent to the power generation element 110A. Note that FIG. 5 is an enlarged view of the portion indicated by the circle E in FIG. 2, which illustrates the connection between the power generation element 110A and the power generation element 110B, which are adjacent to each other. In the first exemplary embodiment, each of the six power generation elements 110 is inserted into a corresponding one of the mounting spaces 173 from the opening 175 of the case body member 171 and then set in position such that the positive electrode current collector plate 111 is located on the left side in FIG. 2 and the negative electrode current collector plate 131 is located on the right side in FIG. 2.

Then, as shown in FIG. 2, the positive electrode connection side portion 115 of the positive electrode current collector plate 111 of each power generation element 110 other than the one located leftmost in FIG. 2 is bent such that the positive electrode connecting portion 112 can be inserted into the connection hole 174 of the partition wall 172 of the case body member 171. Likewise, the negative electrode connection side portion 135 of the negative electrode current collector plate 131 of each power generation element 110 is bent such that the negative electrode connection portion 132 of the negative electrode current collector plate 131 can be inserted into the connection hole 174 of the partition wall 172 of the case body member 171.

That is, as shown in FIG. 5, the negative electrode connection side portion 135A of the negative electrode current collector plate 131A of the power generation element 110A is bent in an attaching direction A2 (the direction toward the right side in FIG. 5), which is the direction toward the power generation element 110B, such that the negative electrode connecting portion 132A enters the connection hole 174C of the partition wall 172C. On the other hand, the positive electrode connection side portion 115B of the positive electrode current collector plate 111B of the power generation element 110B is bent in an attaching direction B2 (the direction toward the left side in FIG. 5), which is the direction toward the power generation element 110A, such that the positive electrode connecting portion 112B enters the connection hole 174C of the partition wall 172C of the case body member 171.

Then, the positive electrode connecting face 112Ba of the positive electrode connecting portion 112B and the negative electrode connecting face 132Aa of the negative electrode connecting portion 132A are abutted against each other in the connection hole 174C of the partition wall 172C (See FIG. 4 and FIG. 5). Then, the contact portion between the positive electrode connecting face 112Ba and the negative electrode connecting face 132Aa is welded by resistance welding, so that the positive electrode connecting face 112Ba and the negative electrode connecting face 132Aa are attached to each other. In this way, the positive electrode current collector plate 111B of the power generation element 110B and the negative electrode current collector plate 131A of the power generation element 110A are fixedly connected to each other via the connection hole 174C in the partition wall 172C (See FIG. 5). Other power generation elements 110 are also connected to each other in the same manner. As such, in the first exemplary embodiment, the six power generation elements 110 (battery cells) are connected in series.

Meanwhile, with regard to the power generation element 110 located leftmost in FIG. 2, the positive electrode connecting portion 112 of the positive electrode current collector plate 111 is connected to an external positive electrode terminal 191. On the other hand, the negative electrode connecting portion 132 of the negative electrode current collector plate 131 of the power generation element 110 that is located at the opposite end, which is not shown in the drawing, is connected to an external negative electrode terminal.

Then, the opening 175 of the case body member 171 is closed liquid-tight by the lid member 176 (See FIG. 1). Then, a prescribed amount of electrolyte is poured into the mounting spaces 173 via the solution inlets 177, and the solution inlets 177 are then closed by the inlet lids 183. This is how the secondary battery 100 shown in FIG. 1 is manufactured.

Meanwhile, as described above, in some of secondary batteries in which electrode assemblies (power generation elements) are disposed in corresponding battery spaces (mounting spaces), the current collector plates of the electrode assemblies that are adjacent to each other are bent such that their projected connecting portions (connecting portions, adjacent connecting portions) can be connected, by welding or the like, to each other through a corresponding communication hole (connecting hole) formed in the battery case. In this case, some of the current collector plates, which are attached to each other as descried above, continue to provide elastic forces that urge the projected connecting portions (adjacent connecting portions) of adjacent electrode assemblies (power generation elements) to move away from each other. In such a case, there is a possibility that pressure concentrates on one of the welded portions between the current collector plate with the elastic force and the respective electrode plates, which is located closest to the projected connecting portion or on the portions near this closest welded portion, and as a result, this closest welded portion is ruptured, whereby the current collector plate and the electrode plate separate from each other at this portion, resulting in an increase in the electric resistance between them.

In view of the above, consideration will now be made of the secondary battery 100 of the first exemplary embodiment. In the following, the connection between the power generation element 110A and the power generation element 110B is taken as an example for the consideration. The power generation element 110A and the power generation element 110B that are adjacent to each other are connected to each other by the positive electrode connecting portion 112B of the positive electrode current collector plate 111B of the power generation element 110B and the negative electrode connecting portion 132A of the negative electrode current collector plate 131A of the power generation element 110A being connected to each other in the connection hole 174 formed in the partition wall 172C of the case body member 171. To allow such a connection between the power generation element 110A and the power generation element 110B, the positive electrode current collector plate 111B and the negative electrode current collector plate 131A are bent in the attaching directions B2, A2, respectively, According to this structure, elastic forces acting in the detaching directions B1, A1 that are opposite to the attaching direction B2, A2, respectively, may remain in the positive electrode current collector plate 111B and the negative electrode current collector plate 131A.

Meanwhile, the positive electrode current collector plate 111 (111B) is welded at the five positive electrode plate welded portions 114 to the respective positive electrode plates 161. In the positive electrode current collector plate 111, the first positive electrode plate welded portion 114a and the positive electrode plate adjacent distal portion 117 are included in the positive electrode plate-shaped portion 113. Because the thickness direction of the positive electrode plate-shaped portion 113 matches the detaching direction B1, if the elastic force acting in the detaching direction B1 remains in the positive electrode current collector plate 111 (111B) as descried above and the positive electrode plate-shaped portion 113 (111B) is provided alone, it increases the possibility that the positive electrode plate-shaped portion 113 bends to cause pressure concentration at the positive electrode plate welded portion 114a. As such, in the secondary battery 100 of the first exemplary embodiment, the bending portions 120 are provided to prevent bending of the first positive electrode plate welded portion 114a and the positive electrode plate adjacent distal portion 117.

Now, a comparison is made between the bending strength of the positive electrode connection side portion 115 (115B) that is located between the first positive electrode plate welded portion 114a and the positive electrode connecting portion 112 and the bending strengths of the first positive electrode plate welded portion 114a and the positive electrode plate adjacent distal portion 117. The positive electrode connection side portion 115 (115B) can more easily bend in the attaching direction B2 that is opposite to the detaching direction B11 than the first positive electrode plate welded portion 114a and the positive electrode plate adjacent distal portion 117, where the bending portions 120 are provided along both sides, do.

Therefore, when an elastic force acting in the detaching direction B1 remains in the positive electrode current collector plate 111B, the remaining elastic force is absorbed by the positive electrode connection side portion 115B bending sharply in the attaching direction B2, while the first positive electrode plate welded portion 114a and the positive electrode plate adjacent distal portion 117 are reliably prevented from bending. As such, it is possible to appropriately prevent concentration of pressure (reactive force) on the first positive electrode plate welded portion 114a, which may otherwise be caused by the elastic force remaining in the positive electrode current collector plate 111B. Thus, in the positive electrode current collector plate 111B, it is possible to prevent cracks and ruptures at the first positive electrode plate welded portion 114a and thus a resultant increase in the electric resistance between the positive electrode current collector plate 111B and the respective positive electrode plates 161. Note that, in the first exemplary embodiment, other positive electrode current collector plates 111 are also structured as described above. As such, the secondary battery 100 according to the first exemplary embodiment provides highly reliable connections between the positive electrode current collector plate 111 and the respective positive electrode plates 161.

Likewise, the negative electrode current collector plate 131A of the power generation element 110A is welded at the five negative electrode plate welded portions 134 to the respective negative electrode plates 162. In the negative electrode current collector plate 131(131A) as well, the bending portions 140 are provided which prevent bending of the first negative electrode plate welded portion 134a and the negative electrode plate adjacent distal portion 137. Thus, as in the case of the positive electrode current collector plate 111 (111B), if a comparison is made between the bending strength of the negative electrode connection side portion 135 (135A) that is located between the first negative electrode plate welded portion 134a and the negative electrode connecting portion 132 and the bending strengths of the first negative electrode plate welded portion 134a and the negative electrode plate adjacent distal portion 137, it is found that the negative electrode connection side portion 135 (135A) bends more easily in the attaching direction A2 that is opposite to the detaching direction A1 than the first negative electrode plate welded portion 134a and the negative electrode plate adjacent distal portion 137, where the bending portions 140 are provided along both sides, do.

Therefore, when an elastic force acting in the detaching direction A1 remains in the negative electrode current collector plate 131A, the remaining elastic force is absorbed by the electrode connection side portion 135A bending sharply in the attaching direction A2, while the first negative electrode plate welded portion 134a and the negative electrode plate adjacent distal portion 137 are reliably prevented from bending. As such, it is possible to appropriately prevent concentration of pressure (reactive force) on the first negative electrode plate welded portion 134a, which may otherwise be caused by the elastic force remaining in the negative electrode current collector plate 131A. Thus, in the negative electrode current collector plate 131A, too, it is possible to prevent cracks and ruptures at the first negative electrode plate welded portion 134a and thus a resultant increase in the electric resistance between the negative electrode current collector plate 131A and the respective negative electrode plates 162. Note that, in the first exemplary embodiment, other negative electrode current collector plates 131 are also structured as described above. As such, the secondary battery 100 according to the first exemplary embodiment provides highly reliable connections between the negative electrode current collector plate 131 and the respective negative electrode plates 162.

The bending portions 120 (the bending portions 140) can be formed by simply bending the lateral edge portions of the positive electrode plate-shaped portion 113 (the negative electrode plate-shaped portion 133). That is, the bending portions 120 (the bending portions 140) can be easily formed at a low cost, which is desirable.

(Second Exemplary Embodiment)

Next, the second exemplary embodiment of the invention will be described with reference to FIG. 6. Power generation elements 210 in the second exemplary embodiment are the same as the power generation elements 110 in the first exemplary embodiment except for the structures of the first current collector plates and the second current collector plates. Therefore, the following description focuses on unlike components and elements, and descriptions on the components and elements that are the same as those in the first exemplary embodiment will be omitted or simplified.

In the second exemplary embodiment, a positive electrode current collector plate 211 has a positive electrode connecting portion 212 of each power generation element 210, a positive electrode connection side portion 215, and a positive electrode distal portion 216 including a positive electrode plate-shaped portion 213. The positive electrode plate-shaped portion 213 includes positive electrode plate welded portions 214. Likewise, a negative electrode current collector plate 231 of each power generation element 210 includes a negative electrode connecting portion 232, a negative electrode connection side portion 235, and a negative electrode plate distal portion 236 including a negative electrode plate-shaped portion 233. The negative electrode plate-shaped portion 233 includes negative electrode plate welded portions 234. The positive electrode plate-shaped portion 213 includes five positive electrode plate welded portions 214. The negative electrode current collector plate 231 includes five negative electrode plate welded portions 234. The positive electrode current collector plate 211 and the negative electrode current collector plate 231 in the second exemplary embodiment are different from those in the first exemplary embodiment in that the positive electrode current collector plate 211 and the negative electrode current collector plate 231 does not include the bending portions 120 and the bending portions 140 and that positive electrode reinforcement plate-shaped portions 213S having beads 220 are provided as portions of the positive electrode plate-shaped portion 213 and negative electrode reinforcement plate-shaped portions 233S having beads 240 are provided as portions of the negative electrode plate-shaped portion 233.

More specifically, in the positive electrode current collector plate 211 in the second exemplary embodiment, the portion between the first positive electrode plate welded portion 214a and the second positive electrode plate welded portion 214b and the portion between the second positive electrode plate welded portion 214b and the third positive electrode plate welded portion 214c are formed as the positive electrode reinforcement plate-shaped portions 213S with the beads 220. Each of the positive electrode reinforcement plate-shaped portions 213S includes the beads 220. The beads 220 extend in the direction connecting the positive electrode connecting portion 212 and the first positive electrode plate welded portion 214a. The beads 220 are formed by convex and concave portions that are arranged in a row in the lateral direction of the positive electrode plate-shaped portion 213 (the horizontal direction in FIG. 6A) as shown in FIG. 6C. The beads 220 are formed by bending the positive electrode plate-shape portion by a given beading process. Note that the positive electrode reinforcement plate-shaped portions 213S correspond to "convex-concave portions" in the invention.

Figure 6:
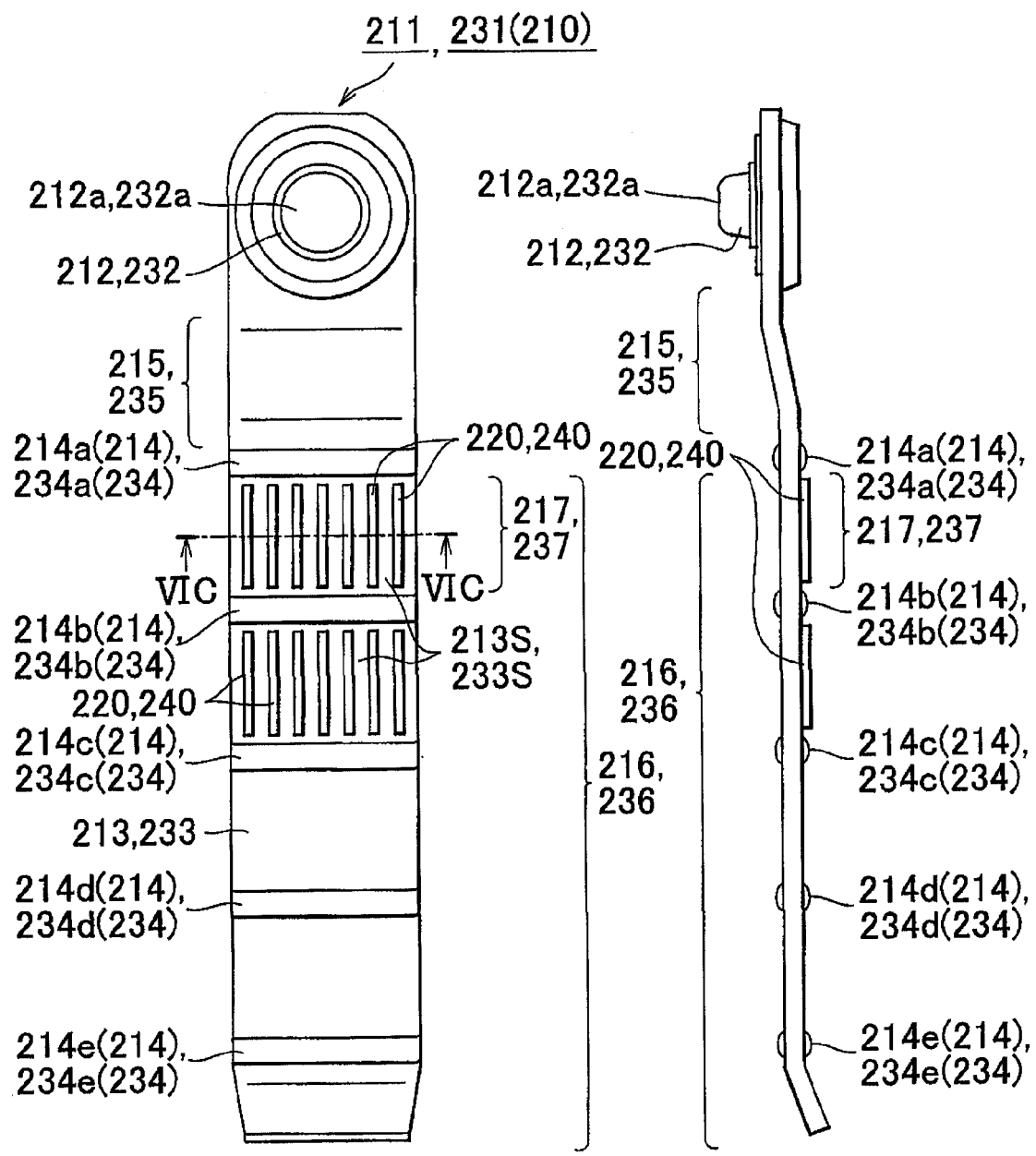
FIG. 6A is a front view of the positive electrode current collector plate and the negative electrode current collector plate used in each power generation element in the second exemplary embodiment.
FIG. 6B is a side view of the same current collector plates.
FIG. 6C is a cross-sectional view taken along the line VIC-VIC in FIG. 6A.

Note that, in FIG. 6 illustrating the second exemplary embodiment, the positive electrode plate adjacent distal portion 217 is indicated, for convenience of description, as the portion between the first positive electrode plate welded portion 214a and the second positive electrode plate welded portion 214b in the positive electrode plate-shaped portion 213.

In the secondary battery 200 of the second exemplary embodiment, the positive electrode current collector plates 211 are arranged in the same manner as the positive electrode current collector plate 111 are arranged in the secondary battery 100 of the first exemplary embodiment. Therefore, in some cases, elastic forces acting in the detaching direction may remain in the positive electrode current collector plates 211 of the secondary battery 200 (battery modules).

Here, a comparison is made between the bending strength of the positive electrode connection side portion 215 (215B) that is located between the first positive electrode plate welded portion 214a and the positive electrode connecting portion 212 and the bending strengths of the first positive electrode plate welded portion 214a and the positive electrode plate adjacent distal portion 217. Then, it is found that the positive electrode connection side portion 215 (215B) bends more easily in the attaching direction (B2 in FIG. 5) that is opposite to the detaching direction (B1 in FIG. 5) than the first positive electrode plate welded portion 214a and the positive electrode plate adjacent distal portion 217, where the positive electrode reinforcement plate-shaped portions 213S having the beads 220 are provided, do. Therefore, when an elastic force acting in the detaching direction (B1) remains in the positive electrode current collector plate 211, the remaining elastic force is absorbed by the positive electrode connection side portion 215 bending sharply in the attaching direction (B2), while the first positive electrode plate welded portion 214a and the positive electrode plate adjacent distal portion 217 are reliably prevented from bending in the attaching direction (B2). As such, it is possible to appropriately prevent concentration of pressure (reactive force) on the first positive electrode plate welded portion 214a, which may otherwise be caused by the elastic force remaining in the positive electrode current collector plate 211.

Meanwhile, the negative electrode current collector plate 231 is a current collector plate that has substantially the same material and shape as those of the positive electrode current collector plate 211 and only differs in polarity. Thus, as in the case of the positive electrode current collector plate 211, negative electrode reinforcement plate-shaped portions 233S with the beads 240 are provided as portions of each negative electrode current collector plate 231, as shown in FIG. 6.

Therefore, when an elastic force acting in the detaching direction remains in the negative electrode current collector plate 231, the remaining elastic force is absorbed by the negative electrode connection side portion 235 bending sharply in the attaching direction (A2 in FIG. 5), while the first negative electrode plate welded portion 234a and the negative electrode plate adjacent distal portion 237 are reliably prevented from bending. As such, it is possible to appropriately prevent concentration of pressure (reactive force) on the first negative electrode plate welded portion 234a, which may otherwise be caused by the elastic force remaining in the negative electrode current collector plate 231.

(Third Exemplary Embodiment)

Hereinafter, the third exemplary embodiment of the invention will be described with reference to FIG. 7 and FIG. 8. Power generation elements 310 in the third exemplary embodiment are the same as the power generation elements 110 in the first exemplary embodiment except for the structures of the first current collector plates and the second current collector plates. Therefore, the following description focuses on unlike components and elements, and descriptions on the components and elements that are the same as those in the first exemplary embodiment will be omitted or simplified.

In the power generation elements 310 of the third exemplary embodiment, each of the positive electrode current collector plate 311 has a positive electrode connecting portion 312, a positive electrode connection side portion 315, and a positive electrode distal portion 316 including a positive electrode plate-shaped portion 313. The positive electrode plate-shaped portion 313 includes positive electrode plate welded portions 314. The negative electrode current collector plate 331 includes a negative electrode connecting portion 332, a negative electrode connection side portion 335, and a negative electrode plate distal portion 336 including a negative electrode plate-shaped portion 333. The negative electrode plate-shaped portion 333 includes negative electrode plate welded portions 334. The positive electrode plate-shaped portion 313 includes five positive electrode plate welded portions 314. The negative electrode current collector plate 331 includes five negative electrode plate welded portions 334. The positive electrode current collector plate 311 and the negative electrode current collector plate 331 in the third exemplary embodiment are different from those in the first exemplary embodiment in that the positive electrode current collector plate 311 includes a positive electrode bending facilitation portion 360, which is provided in the positive electrode connection side portion 315, as well as bending portions 320 and the negative electrode current collector plate 331 includes a negative electrode bending facilitation portion 380, which is provided in the negative electrode connection side portion 335, as well as bending portions 340. The bending portions 320, 340 in the third exemplary embodiment are the same as the bending portions in the first exemplary embodiment.

Figure 7:
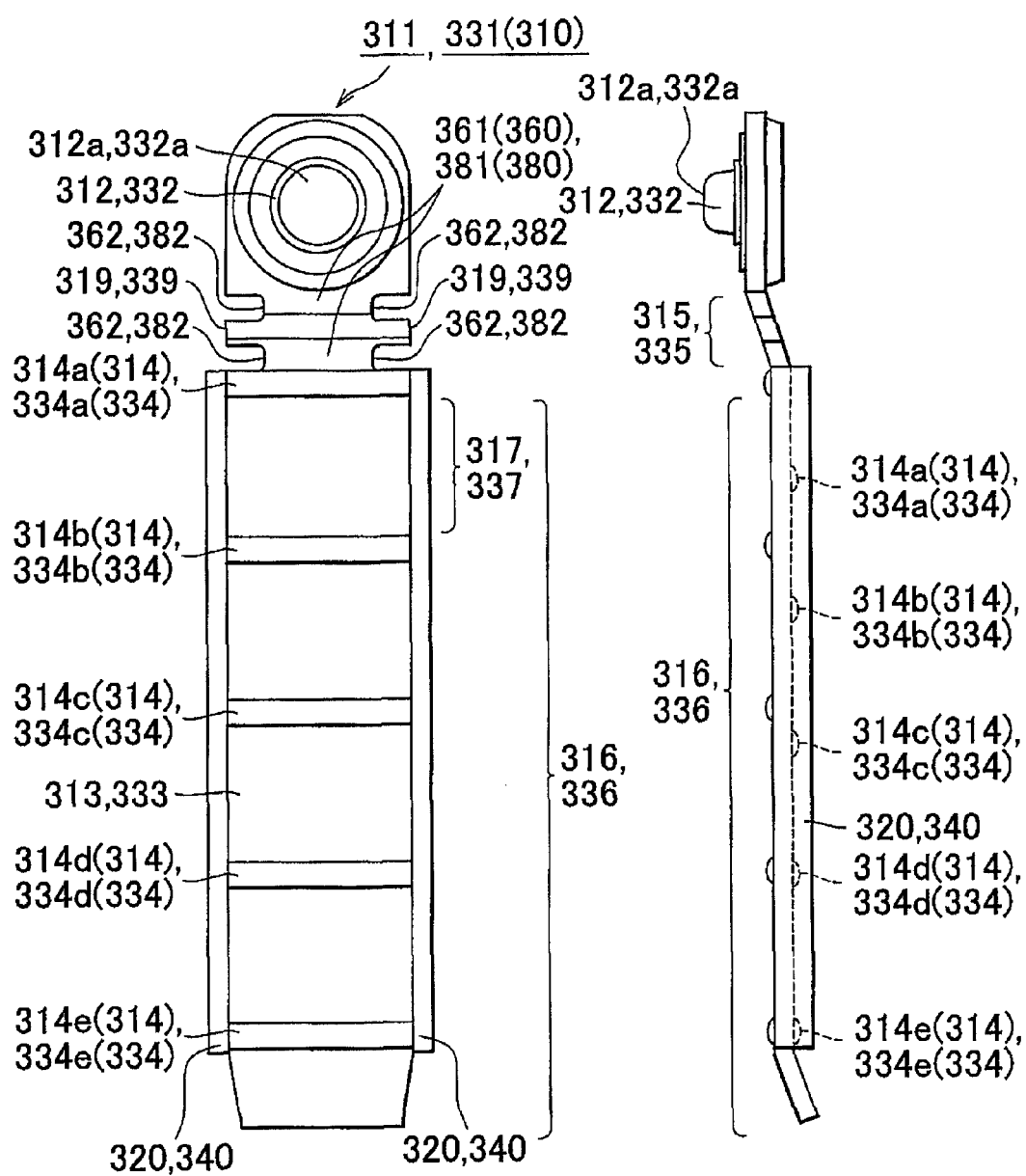
FIG. 7A is a front view of the positive electrode current collector plate and the negative electrode current collector plate used in each power generation element in the third exemplary embodiment.
FIG. 7B is a side view of the same current collector plates.
Figure 8:
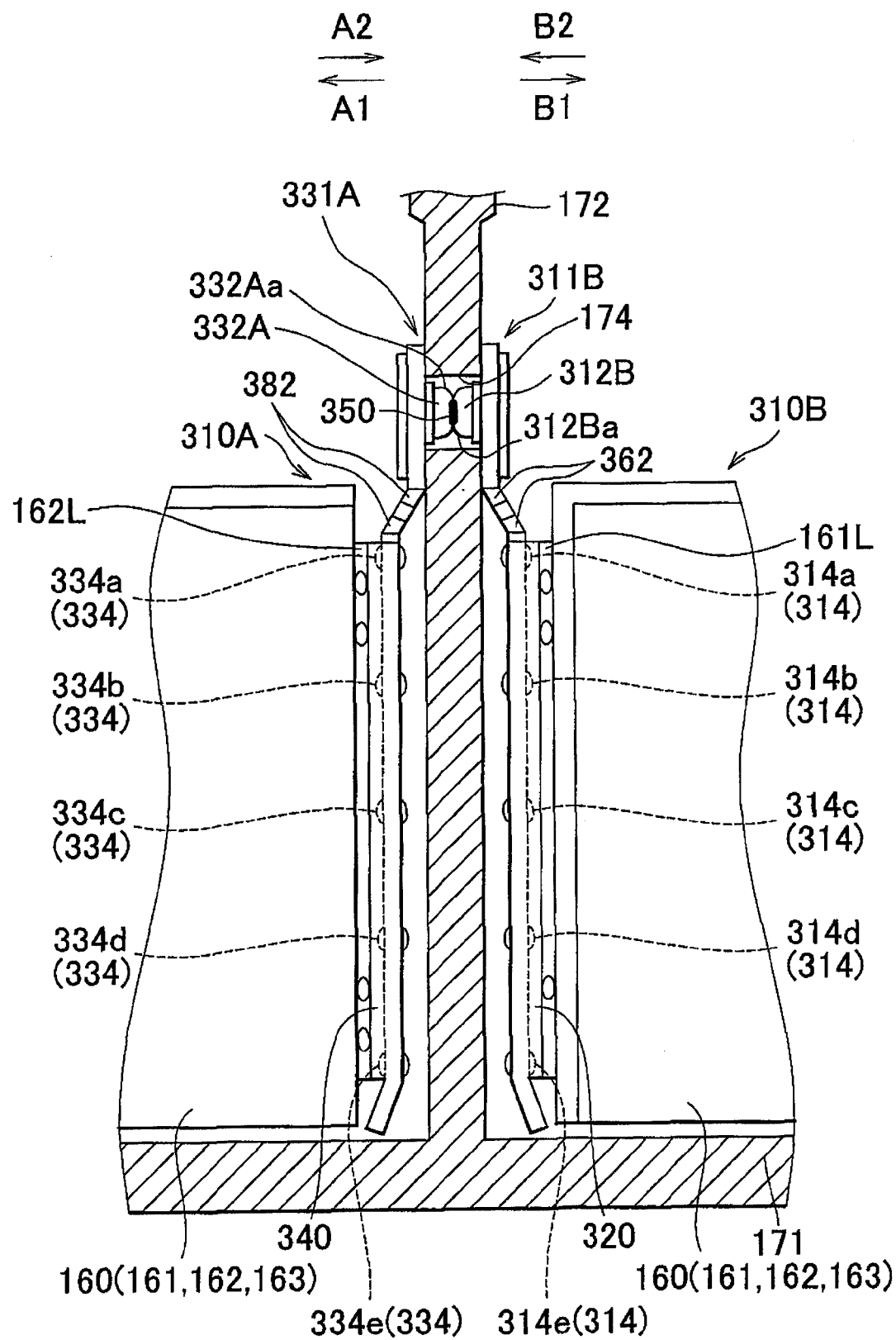
FIG. 8 is a view illustrating the connection between the adjacent power generation elements in the third exemplary embodiment.

More specifically, in each positive electrode current collector plate 311 in the third exemplary embodiment, as shown in FIG. 7, the bending portions 320 are provided at the lateral side edges of the positive electrode plate-shaped portion 313 (the edges on both sides in the horizontal direction in FIG. 7A). In addition, four notches 362 are formed at positive electrode plate edges 319 which are the edges of the positive electrode connection side portion 315 on both sides thereof. The bending portions 320 are plated-shaped portions that bend from the respective lateral side edges of the positive electrode plate-shaped portion 313 and extend in the thickness direction of the positive electrode plate-shaped portion 313. The bending portions 320 are formed across the area where the first positive electrode plate welded portion 314a to 314e are located. That is, the bending portions 320 are also located at both sides of a negative electrode plate adjacent distal portion 317 that is adjacent to the first positive electrode plate welded portion 314a. According to this structure, the bending portions 320 serve to prevent the first positive electrode plate welded portion 314a and the positive electrode plate adjacent distal portion 317 from bending in their thickness directions.

Further, as mentioned above, the four notches 362 are formed in the positive electrode connection side portion 315 of the positive electrode current collector plate 311. The notches 362 extend from the respective positive electrode plate edges 319 toward the inside of the positive electrode connection side portion 315 in two rows, such that two of the notches 362 formed in the positive electrode plate edge 319 on one side face another two of the notches 362 formed in the positive electrode plate edge 319 on the other side. Thus, the portions between the notches 362 on one side and the notches 362 on the other side provide small cross-section portions 361. The area of the cross section of each cross-section portion 361 perpendicular to the direction connecting the positive electrode connecting portion 312 and the first positive electrode plate welded portion 314a (the vertical direction in FIG. 7) is smaller than the cross sectional areas of other portions.

Namely, the cross sectional area of each small cross-section portion 361 is smaller than the cross sectional area of other portion by the total cross sectional area of the notches 362. As such, the small cross-section portions 361 of the positive electrode connection side portion 315 serve as a positive electrode bending facilitation portion 360 that facilities bending the positive electrode connection side portion 315 in the thickness direction thereof.

In the secondary battery 300 (battery modules) of the third exemplary embodiment, the positive electrode current collector plate 311 are arranged in the same manner as the positive electrode current collector plate 111 are arranged in the secondary battery 100 of the first exemplary embodiment. Therefore, in some cases, an elastic force acting in the detaching direction may remain in the positive electrode current collector plate 311. In the power generation elements 310 of the third exemplary embodiment, however, the bending portions 320 are provided to prevent bending of the first positive electrode plate welded portion 314a and the positive electrode plate adjacent distal portion 317, and the small cross-section portions 361, which serve as the positive electrode bending facilitation portion 360, are also provided in the positive electrode connection side portion 315.

Therefore, when an elastic force acting in the detaching direction (B1) remains in the positive electrode current collector plate 311 (311B), due to the presence of the small cross-section portions 361, the remaining elastic force is absorbed by the positive electrode connection side portion 315 bending sharply in the attaching direction (B2), while the bending portions 320 reliably prevent bending of the first positive electrode plate welded portion 314a and the positive electrode plate adjacent distal portion 317. As such, it is possible to appropriately prevent concentration of pressure (reactive force) on the first positive electrode plate welded portion 314a, which may otherwise be cause by the elastic force remaining in the positive electrode current collector plate 311.

Further, because the negative electrode current collector plate 331 is a current collector plate that has substantially the same material and shape as those of the positive electrode current collector plate 311 and only differs in polarity. Therefore, the same effects and advantages as those obtained with the positive electrode current collector plate 311 can be obtained also with the negative electrode current collector plate 331.

As such, according to the structure described above, it is possible to prevent cracks and ruptures at the first positive electrode plate welded portion 314a and thus a resultant increase in the electric resistance between the positive electrode current collector plate 311 and the respective the positive electrode plates 161. Thus, the secondary battery 300 of the third exemplary embodiment provides highly reliable connections between the positive electrode current collector plate 311 and the respective positive electrode plates 161 (See FIG. 8). Also, according to the structure described above, it is possible to prevent cracks and ruptures at the first negative electrode plate welded portion 334a and thus a resultant increase in the electric resistance between the negative electrode current collector plate 331 and the respective negative electrode plates 162. Thus, the secondary battery 300 of the third exemplary embodiment provides highly reliable connections between the negative electrode current collector plate 331 and the respective negative electrode plates 162.

(Fourth Exemplary Embodiment)

Hereinafter, the forth exemplary embodiment of the invention will be described with reference to FIG. 9. Power generation elements 410 in the fourth exemplary embodiment are the same as the power generation elements 310 in the third exemplary embodiment except for the structures of the bending facilitation portions of the first current collector plates and the second current collector plates. Thus, the following description focuses on unlike components and elements and descriptions on the components and elements that are the same as those in the first and third exemplary embodiments will be omitted or simplified.

In the power generation elements 410 of the fourth exemplary embodiment, each positive electrode current collector plate 411 has a positive electrode connecting portion 412, a positive electrode connection side portion 415, and a positive electrode distal portion 416 including a positive electrode plate-shaped portion 413. The positive electrode plate-shaped portion 413 includes positive electrode plate welded portions 414. Likewise, each negative electrode current collector plate 431 has a negative electrode connecting portion 432, a negative electrode connection side portion 435, and a negative electrode plate distal portion 436 including a negative electrode plate-shaped portion 433. The negative electrode plate-shaped portion 433 includes negative electrode plate welded portions 434. The positive electrode plate-shaped portion 413 includes five positive electrode plate welded portions 414, and the negative electrode current collector plate 431 includes five negative electrode plate welded portions 434. The positive electrode current collector plate 411 and the negative electrode current collector plate 431 in the fourth exemplary embodiment are different from those in the third exemplary embodiment in that small cross-section portions 461, which serve as a positive electrode bending facilitation portion 460, are formed by thin portions 462 and small cross section portions 481, which serve as a negative electrode bending facilitation portion 480, are formed by thin portions 482.

Figures 9A, 9B:
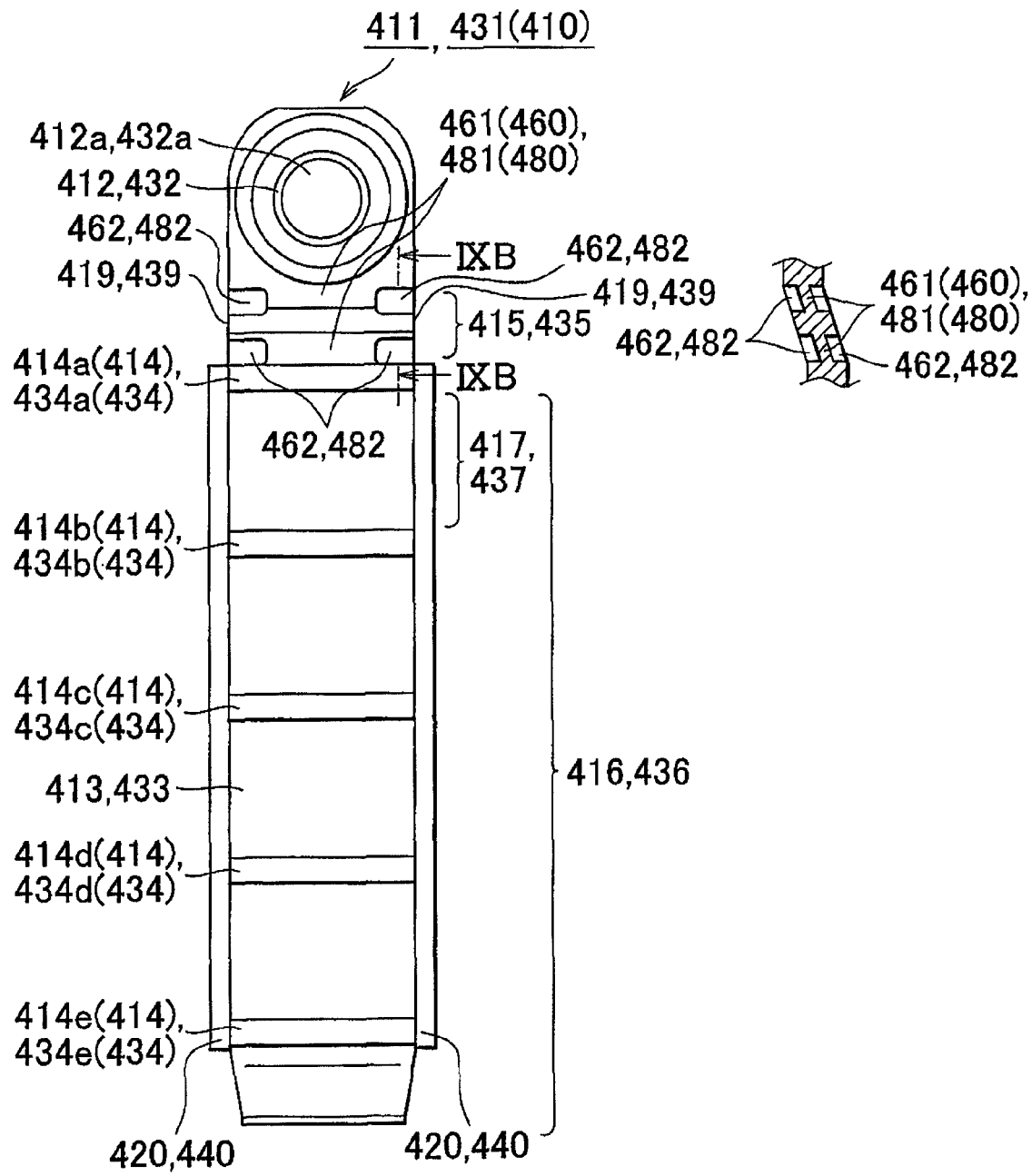
FIG. 9A is a front view of the positive electrode current collector plate and the negative electrode current collector plate used in each power generation element in the fourth exemplary embodiment.
FIG. 9B is a cross-sectional view taken along the line IXB-IXB in FIG. 9A.

More specifically, in each positive electrode current collector plate 411 in the fourth exemplary embodiment, as shown in FIG. 9, the bending portions 420 are provided at the lateral side edges of the positive electrode plate-shaped portion 413 (the edges on both sides in the horizontal direction in FIG. 9A). Further, four thin portions 462 are formed at positive electrode plate edges 419 which are the edges of the positive electrode connection side portion 415 on both sides thereof. The bending portions 420 are plated-shaped portions that bend from the respective lateral side edges of the positive electrode plate-shaped portion 413 and extend in the thickness direction of the positive electrode plate-shaped portion 413. The bending portions 420 are formed across the area where the first positive electrode plate welded portion 414a to 414e are located.

Therefore, the bending portions 420 are also located at both sides of a negative electrode plate adjacent distal portion 417 that is adjacent to the first positive electrode plate welded portion 414a. According to this structure, the bending portions 420 serve to prevent the first positive electrode plate welded portion 414a and the positive electrode plate adjacent distal portion 417 from bending in their thickness directions.

Further, as described above, the four thin portions 462 are formed in the positive electrode connection side portion 415 of the positive electrode current collector plate 411. The thin portions 462 are the portions that are formed thinner than other portions. The thin portions 462 extend from the respective positive electrode plate edges 419 toward the inside of the positive electrode connection side portion 415 in two rows, such that two of the thin portions 462 formed in the positive electrode plate edge 419 on one side face another two of the thin portions 462 formed in the positive electrode plate edge 419 on the other side. Thus, the portions between the thin portions 462 on one side and the thin portions 462 on the other side provide small cross-section portions 461, each of which has a cross sectional area smaller than the cross-sectional areas of other portions on a plane perpendicular to the direction connecting the positive electrode connecting portion 412 and the first positive electrode plate welded portion 414a (the vertical direction in FIG. 9A).

Namely, the cross sectional area of each small cross-section portion 461 is smaller than the cross sectional area of other portion by the amount by which the thickness of each thin portion 462 is smaller than the thickness of other portion of the positive electrode connection side portion 415. As such, the small cross-section portions 461 of the positive electrode connection side portion 415 provide a positive electrode bending facilitation portion 460 that facilities bending the positive electrode connection side portion 415 in the thickness direction thereof.

In the secondary battery 400 (battery modules) of the fourth exemplary embodiment, the positive electrode current collector plates 411 are arranged in the same manner as the positive electrode current collector plates 111 are arranged in the power generation elements 110 of the first exemplary embodiment and as the positive electrode current collector plate 311 are arranged in the power generation elements 310 of the third exemplary embodiment. Therefore, in some cases, an elastic force acting in the detaching direction may remain in the positive electrode current collector plate 411. In the power generation elements 410 of the fourth exemplary embodiment, however, the bending portions 420 are provided to prevent bending of the first positive electrode plate welded portion 414a and the positive electrode plate adjacent distal portion 417, and the small cross-section portions 461, which serve as the positive electrode bending facilitation portion 460, are also provided at the positive electrode connection side portion 415.

Therefore, when an elastic force acting in the detaching direction (B1) remains in the positive electrode current collector plate 311 (311B), due to the presence of the small cross-section portions 461, the remaining elastic force is absorbed by the positive electrode connection side portion 415 bending sharply in the attaching direction (B2), while the bending portions 420 reliably prevent bending of the first positive electrode plate welded portion 414a and the positive electrode plate adjacent distal portion 417. As such, it is possible to appropriately prevent concentration of pressure (reactive force) on the first positive electrode plate welded portion 414a, which may otherwise be caused by the elastic force remaining in the positive electrode current collector plate 411.

Further, because the negative electrode current collector plate 431 is a current collector plate that has substantially the same material and shape as those of the positive electrode current collector plate 411 and only differs in polarity. Therefore, the same effects and advantages as those obtained with the positive electrode current collector plate 411 can be obtained also with the negative electrode current collector plate 431.

While the invention has been described with reference to the first to fourth exemplary embodiments thereof, it is to be understood that the invention is not limited to the exemplary embodiments. Needless to say, the invention is intended to cover various modifications and equivalent arrangements within the scope of the invention. For example, in the first to fourth exemplary embodiments, the positive electrode current collector plates 111, 211, 311, 411, which are the first current collector plates, have been used as the current corrector plates for the positive electrodes, and the negative electrode current collector plate 131, 231, 331, 431, which are the second current collector plates, have been used as the current collector plates for the negative electrodes. However, the first current collector plates may be the current collector plates for the negative electrodes and the second current collector plates may be the current collector plates for the positive electrodes. Further, in the first, third, and fourth exemplary embodiments, the bending portions 120, 320, 420 are formed at the side edges of the portion of the positive electrode plate-shaped portion 113, 313, 413, in which the five positive electrode plate welded portions 111a to 114e, 314a to 314e, 414a to 414e are provided. However, the bending portions may be formed in any portion of each current collector plate as long as bending of the connection side electrode plate welded portion and the adjacent distal portion can be prevented.

Further, while the adjacent power generation elements 110, 210, 310, and 410 are all connected in series in the secondary battery 100, 200, 300, 400 of the first to fourth exemplary embodiments, some or all of the battery modules may be connected in parallel. Also, regarding the connection between the positive electrode plate welded portions and the positive electrode current collector plate, a single positive electrode current collector plate is connected via five positive electrode plate welded portions to positive electrode plates in the first to fourth exemplary embodiment. However, the number of welding points between each first current collector plate and electrode plates and the number of welding points between each second current collector plate and electrode plates may be changed as needed.

What is claimed is:

1. A battery module, comprising:
a plurality of power generation elements each of which has a positive electrode plate, a negative electrode plate, a first current collector plate that is formed in a generally flat shape and welded at at least one electrode plate welded portion to one of the positive electrode plate and the negative electrode plate, and a second current collector plate that is formed in a generally flat shape and welded at at least one electrode plate welded portion to the other of the positive electrode plate and the negative electrode plate; and
a case in which the power generation elements are disposed and which has at least one partition wall that defines a plurality of mounting spaces in the case, the power generation elements being disposed within the respective mounting spaces, wherein
each of the first current collector plate and the second current collector plate has a connecting portion, a connection side electrode plate welded portion that is located closest to the connecting portion among the electrode plate welded portions, a connection side portion that is located between the connection side electrode plate welded portion and the connecting portion, a distal portion that is located further from the connecting portion than the connection side electrode plate welded portion is, and an adjacent distal portion that is a portion of the distal portion and is located adjacent to the connection side electrode plate welded portion,
the first current collector plate and the second current collector plate are connected in a state where elastic forces acting in detaching directions that are opposite to attaching directions remain in the first current collector plate and the second current collector plate,
at least one of the first current collector plate and the second current collector plate has a bending prevention portion that prevents the connection side electrode plate welded portion and the adjacent distal portion from bending in a direction opposite to the detaching direction,
each of the connection side electrode plate welded portion and the adjacent distal portion is a plated-shaped portion, a thickness direction of which matches the detaching direction,
the bending prevention portion is formed in at least one of the connection side electrode plate welded portion and the adjacent distal portion,
a cross section of the bending prevention portion perpendicular to a direction connecting the connecting portion and the connection side electrode plate welded portion has convex and concave portions that are formed in the thickness direction and extend in the direction connecting the connecting portion and the connection side electrode plate welded portion,
a first electrode connecting face of the connecting portion of the first current collector plate of one of the power generation elements is fixedly connected, via a connection hole formed in the partition wall, to a second electrode connecting face of the connecting portion of the second current collector plate of the adjacent power generation element by abutting against each other in the connection hole, and
the connection side portion of the first current collector plate and the connection side portion of the second current collector plate are bent toward each other such that the distal portion of the first current collector plate and the distal portion of the second current collector plate do not contact the partition wall.

2. A battery module, comprising:
a plurality of power generation elements each of which has a positive electrode plate, a negative electrode plate, a first current collector plate that is formed in a generally flat shape and welded at at least one electrode plate welded portion to one of the positive electrode plate and the negative electrode plate, and a second current collector plate that is formed in a generally flat shape and welded at at least one electrode plate welded portion to the other of the positive electrode plate and the negative electrode plate; and
a case in which the power generation elements are disposed and which has at least one partition wall that defines a plurality of mounting spaces in the case, the power generation elements being disposed within the respective mounting spaces, wherein
the first current collector plate and the second current collector plate are connected in a state where elastic forces acting in detaching directions that are opposite to attaching directions remain in the first current collector plate and the second current collector plate, at least one of the first current collector plate and the second current collector plate has a bending facilitation portion that is provided in the connection side portion to facilitate bending of the connection side portion in a direction opposite to the detaching direction, each of the first current collector plate and the second current collector plate has a connecting portion, a connection side electrode plate welded portion that is located closest to the connecting portion among the electrode plate welded portions, a connection side portion that is located between the connection side electrode plate welded portion and the connecting portion, a distal portion that is located further from the connecting portion than the connection side electrode plate welded portion is, and an adjacent distal portion that is a portion of the distal portion and is located adjacent to the connection side electrode plate welded portion, the bending facilitation portion is formed in the connection side portion, a cross section perpendicular to a direction connecting the connection side portion in which the bending facilitation portion is formed and the connection side electrode plate welded portion is a small cross-section portion, a cross sectional area of which is smaller than a cross sectional area of other portion, each of the connection side electrode plate welded portion and the adjacent distal portion is a plated-shaped portion, a thickness direction of which matches the detaching direction, and at least one of the first current collector and the second current collector plate has a plate-shaped bending portion that extends from a face opposite to a connecting face of the at least one of the first current collector and the second current collector, a first electrode connecting face of the connecting portion of the first current collector plate of one of the power generation elements is fixedly connected, via a connection hole formed in the partition wall, to a second electrode connecting face of the connecting portion of the second current collector plate of the adjacent power generation element by abutting against each other in the connection hole, and the connection side portion of the first current collector plate and the connection side portion of the second current collector plate are bent toward each other such that the distal portion of the first current collector plate and the distal portion of the second current collector plate do not contact the partition wall.

3. The battery module according to claim 1, wherein
at least one of the first current collector plate and the second current collector plate has a bending facilitation portion that is provided in the connection side portion to facilitate bending of the connection side portion in the direction opposite to the detaching direction.

4. The battery module according to claim 1, wherein
each of the connection side electrode plate welded portion and the adjacent distal portion is a plated-shaped portion, a thickness direction of which matches the detaching direction, and
the bending prevention portion is a plate-shaped bending portion that bends from the connection side electrode plate welded portion and the adjacent distal portion and extends in the thickness direction of the connection side electrode plate welded portion and the adjacent distal portion.

5. The battery module according to claim 3, wherein
each of the connection side electrode plate welded portion and the adjacent distal portion is a plated-shaped portion, a thickness direction of which matches the detaching direction, and
the bending prevention portion is a plate-shaped bending portion that bends from the connection side electrode plate welded portion and the adjacent distal portion and extends in the thickness direction of the connection side electrode plate welded portion and the adjacent distal portion.

6. The battery module according to claim 3, wherein
each of the connection side electrode plate welded portion and the adjacent distal portion is a plated-shaped portion, a thickness direction of which matches the detaching direction,
the bending prevention portion is formed in at least one of the connection side electrode plate welded portion and the adjacent distal portion, and
a cross section of the bending prevention portion perpendicular to a direction connecting the connecting portion and the connection side electrode plate welded portion has convex and concave portions that are formed in the thickness direction.

7. The battery module according to claim 3, wherein
the bending facilitation portion is a small cross section portion which is formed in the connection side portion and a cross sectional area of which is smaller than the cross sectional area of other portion on a plane perpendicular to a direction connecting the connecting portion and the connection side electrode plate welded portion.

8. The battery module according to claim 2, wherein
the bending facilitation portion is formed by providing a notch in the connection side portion.

9. The battery module according to claim 2, wherein
the bending facilitation portion is formed by providing a thin portion at the connection side portion.

* * * * *